(12) United States Patent
Hsu et al.

(10) Patent No.: US 12,630,463 B2
(45) Date of Patent: May 19, 2026

(54) GLASS COMPOSITION, AND GLASS FIBER AND GLASS ARTICLE INCLUDING THE SAME

(71) Applicant: FULLTECH FIBER GLASS CORP., Douliu City (TW)

(72) Inventors: Wen-Ho Hsu, Douliu City (TW); Bih-Cherng Chern, Douliu City (TW); Chih-Yuan Chang, Douliu City (TW); Yueh-Heng Lee, Douliu City (TW); Wei-Chih Lo, Douliu City (TW)

(73) Assignee: FULLTECH FIBER GLASS CORP., Douliu City (TW)

( * ) Notice: Subject to any disclaimer, the term of this patent is extended or adjusted under 35 U.S.C. 154(b) by 801 days.

(21) Appl. No.: 17/939,407

(22) Filed: Sep. 7, 2022

(65) Prior Publication Data

US 2023/0103701 A1 Apr. 6, 2023

(30) Foreign Application Priority Data

Sep. 30, 2021 (TW) ................................. 110136516

(51) Int. Cl.
*C03C 3/093* (2006.01)
*C03C 13/00* (2006.01)

(52) U.S. Cl.
CPC .............. *C03C 3/093* (2013.01); *C03C 13/00* (2013.01); *C03C 2201/54* (2013.01); *C03C 2213/00* (2013.01)

(58) Field of Classification Search
CPC ......... C03C 3/093; C03C 3/118; C03C 13/00; C03C 2201/54; C03C 2213/00; H01Q 1/42; H05K 1/0306
See application file for complete search history.

(56) References Cited

U.S. PATENT DOCUMENTS

| | | | | |
|---|---|---|---|---|
| 2003/0207748 | A1* | 11/2003 | Wallenberger | C03C 3/087 501/66 |
| 2008/0146430 | A1* | 6/2008 | Li | C03C 3/118 501/59 |
| 2021/0206687 | A1* | 7/2021 | Hsu | C03C 13/045 |

FOREIGN PATENT DOCUMENTS

| | | |
|---|---|---|
| TW | I694976 B | 6/2020 |
| TW | 202122360 A | 6/2021 |

OTHER PUBLICATIONS

Search Report appended to an Office Action, which was issued to Taiwanese counterpart application No. 110136516 by the TIPO on Dec. 15, 2021, with an English translation thereof (2 pages).

* cited by examiner

*Primary Examiner* — Laura A Auer
(74) *Attorney, Agent, or Firm* — HSML P.C.

(57) ABSTRACT

Disclosed herein is a glass composition including, based on a total weight of the glass composition, 49 wt % to 59 wt % of $SiO_2$, 9.5 wt % to 14.5 wt % of $Al_2O_3$, 19 wt % to 35 wt % of $B_2O_3$, 2 wt % to 5 wt % of CaO, 0.25 wt % to 3 wt % of ZnO, 0 wt % to 1 wt % of MgO, 0 wt % to 1 wt % of $TiO_2$, 0 wt % to 3 wt % of $ZrO_2$, and 0.1 wt % to 3.5 wt % of MnO. Also disclosed herein are a glass fiber and a glass article which include the glass composition.

5 Claims, No Drawings

GLASS COMPOSITION, AND GLASS FIBER AND GLASS ARTICLE INCLUDING THE SAME

CROSS-REFERENCE TO RELATED APPLICATION

This application claims priority to Taiwanese Invention Patent Application No. 110136516, filed on Sep. 30, 2021.

FIELD

The present disclosure relates to a glass composition, and more particularly to a glass composition having a good forming window. The present disclosure also relates to a glass fiber which includes the glass composition and which have a low dielectric constant and a low dielectric loss tangent. The present disclosure also relates to a glass article including the glass fiber.

BACKGROUND

Taiwanese Invention Patent No. I694976B discloses a glass fiber which is made from a glass composition and which has a low dielectric constant and a low number of bubbles. The glass composition includes 52 wt % to 58 wt % of $SiO_2$, 12 wt % to 16 wt % of $Al_2O_3$, 16 wt % to 26 wt % of $B_2O_3$, greater than 0 wt % and not greater than 2 wt % of MgO, 1 wt % to 6 wt % of CaO, greater than 1 wt % and lower than 5 wt % of $TiO_2$, greater than 0 wt % and not greater than 0.6 wt % of $Na_2O$, 0 wt % to 0.5 wt % of $K_2O$, 0 wt % to 1 wt % of $F_2$, 1 wt % to 5 wt % of ZnO, greater than 0 wt % and not greater than 1 wt % of $Fe_2O_3$, and 0.1 wt % to 0.6 wt % of $SO_3$.

With the glass composition including the aforesaid components and the required content ranges of such components, the glass composition has a good forming window, and the glass fiber formed from the glass composition has the advantages of a low number of bubbles, a low dielectric constant, and a low dielectric loss tangent. However, when the glass fiber formed from the glass composition is used in an environment having a frequency of 10 GHz, there is still a problem of the glass fiber having an excessive dielectric constant and an excessive dielectric loss tangent.

SUMMARY

Therefore, a first object of the present disclosure is to provide a glass composition which can alleviate at least one of the drawbacks of the prior art.

The glass composition includes, based on a total weight of the glass composition: 49 wt % to 59 wt % of $SiO_2$; 9.5 wt % to 14.5 wt % of $Al_2O_3$; 19 wt % to 35 wt % of $B_2O_3$; 2 wt % to 5 wt % of CaO; 0.25 wt % to 3 wt % of ZnO; 0 wt % to 1 wt % of MgO; 0 wt % to 1 wt % of $TiO_2$; 0 wt % to 3 wt % of $ZrO_2$; and 0.1 wt % to 3.5 wt % of MnO. A second object of the present disclosure is to provide a glass fiber including a glass composition as described above, which can alleviate at least one of the drawbacks of the prior art.

A third object of the present disclosure is to provide a glass article including a glass fiber as described above, which can alleviate at least one of the drawbacks of the prior art.

DETAILED DESCRIPTION

Before the present disclosure is described in greater detail, it should be noted that if any prior art publication is referred to herein, such reference does not constitute an admission that the publication forms a part of the common general knowledge in the art, in Taiwan or any other country. For the purpose of this specification, it will be clearly understood that the word "comprising" means "including but not limited to", and that the word "comprises" has a corresponding meaning.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some aspects ±100%, in some aspects ±50%, in some aspects ±20%, in some aspects ±10%, in some aspects ±5%, in some aspects ±1%, in some aspects ±0.5%, and in some aspects ±0.1% from the specified amount, as such variations are appropriate to perform the disclosed methods or employ the disclosed compositions.

The present disclosure provides a glass composition including, based on a total weight of the glass composition: 49 wt % to 59 wt % of $SiO_2$, 9.5 wt % to 14.5 wt % of $Al_2O_3$, 19 wt % to 35 wt % of $B_2O_3$, 2 wt % to 5 wt % of CaO, 0.25 wt % to 3 wt % of ZnO, 0 wt % to 1 wt % of MgO, 0 wt % to 1 wt % of $TiO_2$, 0 wt % to 3 wt % of $ZrO_2$, and 0.1 wt % to 3.5 wt % of MnO. According to the present disclosure, as $SiO_2$ is present in an amount ranging from 49 wt % to 59 wt %, the glass composition may have an appropriate viscosity when it is melted, which is advantageous for forming a glass fiber by spinning. As a result, the glass fiber and a glass article each formed from the glass composition may have a low dielectric constant and a low dielectric loss tangent.

According to the present disclosure, as $Al_2O_3$ is present in an amount ranging from 9.5 wt % to 14.5 wt %, the glass composition is free from the phenomenon of phase separation when it is melted, and may have a good forming window.

According to the present disclosure, as $B_2O_3$ is present in an amount ranging from 19 wt % to 35 wt %, a glass fiber formed from the glass composition may have a low dielectric constant and a low dielectric loss tangent. In addition, the glass fiber may have a good tensile strength, and when applied to a printed circuit board, may improve the mechanical strength of the printed circuit board.

According to the present disclosure, as CaO is present in an amount ranging from 2 wt % to 5 wt %, the glass composition is free from the phenomenon of phase separation when it is melted, and may have a good forming window. In addition, the glass fiber formed from the glass composition may have a low dielectric constant and a low dielectric loss tangent.

According to the present disclosure, as ZnO is present in an amount ranging from 0.25 wt % to 3 wt %, the glass composition is free from the phenomenon of phase separation when it is melted, and may have a good forming window.

According to the present disclosure, as MnO is present in an amount ranging from 0.1 wt % to 3.5 wt %, the glass composition may have a large forming window which is advantageous for forming the glass fiber by spinning. As a result, the glass fiber formed by the glass composition may have a low dielectric constant and a low dielectric loss tangent.

According to the present disclosure, as MgO is present in an amount ranging from 0 wt % to 1 wt %, the glass composition may have a low viscosity and is free from the phenomenon of phase separation when it is melted, which is advantageous for forming the glass fiber by spinning.

According to the present disclosure, as $ZrO_2$ is present in an amount ranging from 0 wt % to 3 wt %, the glass composition may have a good forming window, and is free from the phenomenon of phase separation when it is melted. In addition, the glass fiber formed from the glass composition may have a low dielectric constant and a dielectric loss tangent.

According to the present disclosure, as $TiO_2$ is present in an amount ranging from 0 wt % to 1 wt %, the glass composition may have a good forming window.

In order to provide the glass composition a low melting temperature and a low viscosity when it is melted, and in order to provide the glass fiber formed from the glass composition a low dielectric constant and a low dielectric loss tangent, in certain embodiments, the glass composition further includes $Na_2O$ as a fluxing agent, which is present in an amount of not greater than 0.5 wt %.

In order to provide the glass composition a low melting temperature and a low viscosity which is advantegeous for forming the glass fiber or a glass article, and in order to provide the glass fiber or the glass article formed from the glass composition a low dielectric constant and a low dielectric loss tangent, in certain embodiments, the glass composition further includes $K_2O$ as a fluxing agent, which is present in an amount of not greater than 0.5 wt %.

In order to reduce corrosion caused by the glass composition on the refractory bricks of a furnace which shortens the life of the furnace and increases the production cost, and in order to provide the glass fiber formed from the glass composition a low dielectric constant and a low dielectric loss tangent, in certain embodiments, the glass composition further includes $F_2$ which is present in an amount of not greater than 3 wt %.

In order to monitor the redox of the glass composition during melting such that the glass refining process (i.e., debubbling process) is stabilized by the redox during melting, and in order to provide the glass fiber formed from the glass composition a low dielectric constant and a low dielectric loss tangent, in certain embodiments, the glass composition further includes $Fe_2O_3$ that is present in an amount of not greater than 1 wt %.

Furthermore, without adversely affecting the dielectric constant and the dielectric loss tangent, the glass composition of the present disclosure may further include other components, e.g., at least one of $Li_2O$, $Cr^2O_3$, $As_2O_3$, $Sb_2O_3$, $V_2O_3$, $P_2O_5$, $Cl_2$, BeO, BaO, $Sc_2O_3$, $SnO_2$, and SrO, which are present in an amount of not greater than 3 wt % based on the total amount of the glass composition.

Further, the present disclosure provides a glass fiber which includes the aforesaid glass composition.

Still further, the present disclosure provides a glass article which includes the glass fiber as described above.

According to the present disclosure, examples of the glass article may include, but are not limited to, printed circuit board, an integrated circuit board, and a radome.

The present disclosure will be further described by way of the following examples. However, it should be understood that the following examples are intended solely for the purpose of illustration and should not be construed as limiting the present disclosure in practice.

EXAMPLES

Preparation of Glass Composition and Glass Block

For each of seven examples, i.e., Examples 1 to 7 (EX1 to EX7) and nine comparative examples, i.e., Comparative Examples 1 to 9 (CE1 to CE9), a glass composition was prepared using the corresponding recipe shown in Tables 1 and 2 below, which was then used to prepare a glass block.

To be specific, all the ingredients listed in the respective recipe shown in Tables 1 and 2 were evenly mixed to obtain the corresponding glass composition. The glass composition was heated in a high temperature furnace at 1500° C. to 1550° C. for 3 to 5 hours. The resultant molten glass was poured into a graphite crucible having a diameter of 40 mm, and the graphite crucible was then placed in an annealing furnace preheated to 800° C. Then, the molten glass was allowed to slowly cool to room temperature, so as to form a glass block. Thereafter, the glass block was ground and polished to obtain a glass specimen (e.g., glass sheet) having a thickness of 0.60 mm to 0.79 mm.

Characteristic Evaluation

1. Measurement of Dielectric Constant ($D_k$) and Dielectric Loss Tangent ($D_f$)

The dielectric constant and the dielectric loss tangent of the respective glass sheet were measured using a vector network analyzer (commercially available from Rohde & Schwarz, Model: ZNB20) in combination with a Split Post Dielectric Resonator (commercially available from Waveray Technology Co., Ltd.) at a frequency of 10 GHz. The results are shown in Tables 1 and 2.

2. Measurement of Forming Window (ΔT)

2.25 g of the respective glass block was heated in a high temperature furnace at a predetermined temperature for 2 hours. The glass block was then taken out from the high temperature furnace and allowed to cool to room temperature. Thereafter, crystallization phenomenon in the glass block was visually observed. If crystals were present in the glass block, the predetermined temperature was the devitrification temperature of the glass composition.

The forming window (ΔT) of the glass composition was determined by subtracting the devitrification temperature from the temperature at which the glass composition has a viscosity of 1000 poise. The greater the forming window (ΔT) of a glass composition, the more conducive it is to form the glass fiber by a spinning process. The results are shown in Tables 1 and 2.

3. Observation for Phase Separation

The appearance of the respective glass block was visually observed. When the glass block had a uniform color, the glass block was in a homogeneous phase without phase separation. On the other hand, when the glass block was opaque and had uneven color, the glass block was not in a homogeneous phase and showed phase separation. The results are shown in Tables 1 and 2.

%, $TiO_2$ was present in an amount ranging from 0 wt % to 1 wt %, $ZrO_2$ was present in an amount ranging from 0 wt % to 3 wt %, and MnO was present in an amount ranging

TABLE 1

| | | EX1 | EX2 | EX3 | EX4 | EX5 | EX6 | EX7 |
|---|---|---|---|---|---|---|---|---|
| Ingredients of glass composition (wt %) | $SiO_2$ | 50.0 | 54.4 | 54.4 | 55.0 | 57.4 | 57.4 | 56.4 |
| | $Al_2O_3$ | 11.0 | 11.0 | 13.0 | 11.0 | 13.5 | 10.5 | 11.0 |
| | $B_2O_3$ | 33.3 | 25.5 | 25.5 | 27.0 | 22.5 | 24.5 | 24.5 |
| | MgO | 0.6 | 0.4 | 0.4 | 0.2 | 0.3 | 0.1 | 0.4 |
| | CaO | 2.6 | 2.6 | 2.6 | 2.0 | 3.0 | 4.0 | 2.6 |
| | $TiO_2$ | 0.4 | 0.7 | 0.7 | 0.4 | 0.5 | 0.4 | 0.8 |
| | $Na_2O$ | 0.1 | 0.1 | 0.1 | 0.1 | 0.1 | 0.1 | 0.1 |
| | $K_2O$ | 0.1 | 0.1 | 0.1 | 0.1 | 0.1 | 0.1 | 0.1 |
| | $F_2$ | 0.5 | 0 | 0 | 0 | 1.0 | 1.2 | 0 |
| | ZnO | 0.5 | 1.0 | 1.0 | 1.0 | 1.0 | 1.2 | 2.5 |
| | $Fe_2O_3$ | 0.1 | 0.2 | 0.2 | 0.2 | 0.1 | 0.2 | 0.1 |
| | $ZrO_2$ | 0.3 | 2.0 | 0 | 0 | 0 | 0 | 1.0 |
| | MnO | 0.5 | 2.0 | 2.0 | 3.0 | 0.5 | 0.3 | 0.5 |
| Dielectric constant ($D_k$) at 10 GHz | | 4.19 | 4.46 | 4.45 | 4.32 | 4.39 | 4.30 | 4.39 |
| Dielectric loss tangent ($D_f$) at 10 GHz ($\times 10^{-3}$) | | 1.8 | 2.3 | 2.4 | 2.0 | 2.0 | 1.8 | 2.2 |
| Forming window ($\Delta T$) | | >100 | >100 | >100 | >100 | >100 | >100 | >100 |
| Phase separation | | No | No | No | No | No | No | No |

TABLE 2

| | | CE1 | CE2 | CE3 | CE4 | CE5 | CE6 | CE7 | CE8 | CE9 |
|---|---|---|---|---|---|---|---|---|---|---|
| Ingredients of glass composition (wt %) | $SiO_2$ | 53.2 | 56.5 | 55.0 | 52.0 | 53.5 | 51.5 | 55.3 | 51.5 | 52.1 |
| | $Al_2O_3$ | 15.0 | 8.6 | 10.0 | 13.7 | 13.5 | 13.5 | 13.6 | 13.5 | 12.0 |
| | $B_2O_3$ | 25.0 | 27.1 | 28.0 | 28.5 | 27.1 | 26.9 | 26.8 | 23.5 | 27.0 |
| | MgO | 0.4 | 0.4 | 2.0 | 0.4 | 0.4 | 0.2 | 0.4 | 0.7 | 0.4 |
| | CaO | 2.6 | 3.2 | 2.2 | 2.0 | 2.4 | 2.0 | 2.3 | 4.0 | 2.6 |
| | $TiO_2$ | 0.8 | 0.3 | 0.4 | 2.0 | 0.7 | 0.5 | 0.7 | 0.6 | 0.7 |
| | $Na_2O$ | 0.1 | 0.0 | 0.1 | 0.1 | 0.1 | 0.1 | 0.1 | 0.1 | 0.1 |
| | $K_2O$ | 0.1 | 0.1 | 0.1 | 0.1 | 0.1 | 0.1 | 0.1 | 0.1 | 0.1 |
| | $F_2$ | 0 | 0 | 0 | 0 | 1.0 | 0.9 | 0 | 0 | 0 |
| | ZnO | 1.0 | 2.5 | 1.5 | 0.5 | 0 | 3.5 | 0.5 | 1.8 | 1.0 |
| | $Fe_2O_3$ | 0.4 | 0.3 | 0.2 | 0.2 | 0.2 | 0.2 | 0.2 | 0.2 | 0.2 |
| | $ZrO_2$ | 0 | 0 | 0 | 0 | 0 | 0 | 0 | 0 | 3.3 |
| | MnO | 1.4 | 1.0 | 0.5 | 0.5 | 1.0 | 0.6 | 0 | 4.0 | 0.5 |
| Dielectric constant ($D_k$) at 10 GHz | | 4.54 | 4.27 | 4.29 | 4.32 | 4.30 | 4.38 | 4.27 | 4.83 | 4.46 |
| Dielectric loss tangent ($D_f$) at 10 GHz ($\times 10^{-3}$) | | 3.0 | 1.9 | 1.9 | 2.2 | 1.8 | 2.0 | 1.9 | 3.3 | 2.2 |
| Forming window ($\Delta T$) | | <50 | >100 | >100 | <50 | <50 | <50 | <50 | >100 | <100 |
| Phase separation | | No | Yes | Yes | No | No | Yes | No | No | Yes |

Referring to Tables 1 and 2, by including the combination of $SiO_2$, $Al_2O_3$, $B_2O_3$, CaO, ZnO, MgO, $TiO_2$, $ZrO_2$, and MnO in the glass composition of the present disclosure, and by requiring specific content ranges of these components in the glass composition, i.e., based on a total weight of the glass composition, $SiO_2$ was present in an amount ranging from 49 wt % to 59 wt %, $Al_2O_3$ was present in an amount ranging from 9.5 wt % to 14.5 wt %, $B_2O_3$ was present in an amount ranging from 19 wt % to 35 wt %, CaO was present in an amount ranging from 2 wt % to 5 wt %, ZnO was present in an amount ranging from 0.25 wt % to 3 wt %, MgO was present in an amount ranging from 0 wt % to 1 wt %, $TiO_2$ was present in an amount ranging from 0 wt % to 1 wt %, $ZrO_2$ was present in an amount ranging from 0 wt % to 3 wt %, and MnO was present in an amount ranging from 0.1 wt % to 3.5 wt %, the glass sheet or glass block formed from the glass composition, when measured at a frequency of 10 GHz, had a dielectric constant not greater than 4.5 and a dielectric loss tangent not greater than $2.4 \times 10^{-3}$. In addition, the glass composition of the present disclosure was free from the phenomenon of phase separation, and had a good forming window.

In contrast, in the glass composition of CE1, $Al_2O_3$ was present in an amount greater than 14.5 wt %, and the glass sheet or glass block formed therefrom, when measured at a frequency of 10 GHz, had a dielectric constant greater than 4.5 and a dielectric loss tangent greater than $2.4 \times 10^{-3}$, indicating that when the glass fiber formed from the glass composition of CE1 is applied to a printed circuit board, an electrical signal in the printed circuit board might have poor signal integrity and poor propagation speed. In addition, the forming window of the glass composition of CE1 was not good.

In the glass compositions of CE2 to CE7 and CE9, since one of $Al_2O_3$, MgO, $TiO_2$, ZnO, $ZrO_2$, and MnO was not present in the amount as required in the glass composition of the present disclosure, i.e., $Al_2O_3$ ranging from 9.5 wt % to 14.5 wt %, MgO ranging from 0 wt % to 1 wt %, $TiO_2$ ranging from 0 wt % to 1 wt %, ZnO ranging from 0.25 wt % to 3 wt %, $ZrO_2$ ranging from 0 wt % to 3 wt %, and MnO ranging from 0.1 wt % to 3.5 wt %, respectively, the glass compositions of CE2 to CE7 and CE9 showed phase separation and/or poor forming window.

In the glass composition of CE8, MnO was present in an amount greater than 3.5 wt %, and the glass sheet or glass block formed therefrom, at a frequency of 10 GHz, had a dielectric constant greater than 4.5 and a dielectric loss tangent greater than $2.4 \times 10^{-3}$, indicating that when the glass fiber formed from the glass composition of CE8 is applied to a printed circuit board, an electrical signal in the printed circuit board might have poor signal integrity and poor propagation speed.

In summary, the glass composition of the present disclosure has a good forming window and is without occurrence of phase separation due to the combination of all the required components and the required content ranges of these components in the glass composition. In addition, the glass fiber and the glass article including the glass composition of the present disclosure also have a low dielectric constant and a low dielectric loss tangent.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A glass composition comprising, based on a total weight of said glass composition:
    49 wt % to 59 wt % of $SiO_2$;
    5.5 wt % to 14.5 wt % of $Al_2O_3$;
    19 wt % to 35 wt % of $B_2O_3$;
    2 wt % to 5 wt % of CaO;
    0.25 wt % to 3 wt % of ZnO;
    0 wt % to 1 wt % of MgO;
    0 wt % to 1 wt % of $TiO_2$;
    0 wt % to 3 wt % of $ZrO_2$;
    0.5 wt % to 3.5 wt % of MnO;
    not greater than 0.5 wt % of $Na_2O$;
    not greater than 0.5 wt % of $K_2O$;
    not greater than 3 wt % of $F_2$; and
    not greater than 1 wt % of $Fe_2O_3$.

2. A glass fiber comprising a glass composition as claimed in claim 1.

3. A glass article comprising a glass fiber as claimed in claim 2.

4. The glass article as claimed in claim 3, which is selected from a printed circuit board, an integrated circuit board, or a radome.

5. A glass composition consisting of, based on a total weight of said glass composition:
    49 wt % to 59 wt % of $SiO_2$;
    5.5 wt % to 14.5 wt % of $Al_2O_3$;
    19 wt % to 35 wt % of $B_2O_3$;
    2 wt % to 5 wt % of CaO;
    0.25 wt % to 3 wt % of ZnO;
    0 wt % to 1 wt % of MgO;
    0 wt % to 1 wt % of $TiO_2$;
    0 wt % to 3 wt % of $ZrO_2$;
    0.5 wt % to 3.5 wt % of MnO,
    not greater than 0.5 wt % of $Na_2O$;
    not greater than 0.5 wt % of $K_2O$;
    not greater than 3 wt % of $F_2$; and
    not greater than 1 wt % of $Fe_2O_3$.

* * * * *